(12) United States Patent
Lee

(10) Patent No.: US 7,677,785 B2
(45) Date of Patent: Mar. 16, 2010

(54) BACKLIGHT MODULE AND AN OPTICAL SLICE UNIT SUPPORT DEVICE THEREOF

(75) Inventor: Ping Lee, Hsinchu (TW)

(73) Assignee: AU Optronics Corporation, Hinschu (TW)

( * ) Notice: Subject to any disclaimer, the term of this patent is extended or adjusted under 35 U.S.C. 154(b) by 178 days.

(21) Appl. No.: 11/842,276

(22) Filed: Aug. 21, 2007

(65) Prior Publication Data
US 2008/0123369 A1 May 29, 2008

(30) Foreign Application Priority Data
Nov. 27, 2006 (TW) .............................. 95143767 A

(51) Int. Cl.
*F21V 7/04* (2006.01)
(52) U.S. Cl. ...................... 362/634; 362/633
(58) Field of Classification Search ................ 362/632, 362/633, 634, 457; 349/58, 60, 65, 67, 70
See application file for complete search history.

(56) References Cited

U.S. PATENT DOCUMENTS

| | | | | |
|---|---|---|---|---|
| 7,086,774 | B2 * | 8/2006 | Katsuda et al. | 362/634 |
| 7,357,560 | B2 * | 4/2008 | Chen et al. | 362/633 |
| 7,419,293 | B2 * | 9/2008 | Yu et al. | 362/634 |
| 2004/0150981 | A1 | 8/2004 | Katsuda et al. | |
| 2006/0187681 | A1 * | 8/2006 | Hsiao et al. | 362/634 |
| 2007/0030701 | A1 * | 2/2007 | Chang | 362/633 |

FOREIGN PATENT DOCUMENTS

CN          1549026          11/2004

OTHER PUBLICATIONS

Chinese language office action dated Jan. 18, 2008.
English language translation of abstract and pertinent parts of CN 1549026, Nov. 24, 2004.

* cited by examiner

*Primary Examiner*—Jacob Y Choi
(74) *Attorney, Agent, or Firm*—Thomas, Kayden, Horstemeyer & Risley

(57) ABSTRACT

The present invention provides a backlight module and a support device for a sheet-form optical element contained within the backlight module. The backlight module mainly includes a frame, a support device and the sheet-form optical element disposed within the frame. The support device includes a support portion and a positioning portion. The support portion has a support end and a connection end. The support end extends into the space within the frame, and supports the bottom end of the sheet-form optical element. The positioning portion has a first end, a second end and a bend portion connecting the first end with the second end. The first end connects to the connection end of the support portion, and an included angle exists between the first end and the support portion. The positioning portion of the support device is inset in the frame to provide a support force for the support portion.

7 Claims, 8 Drawing Sheets

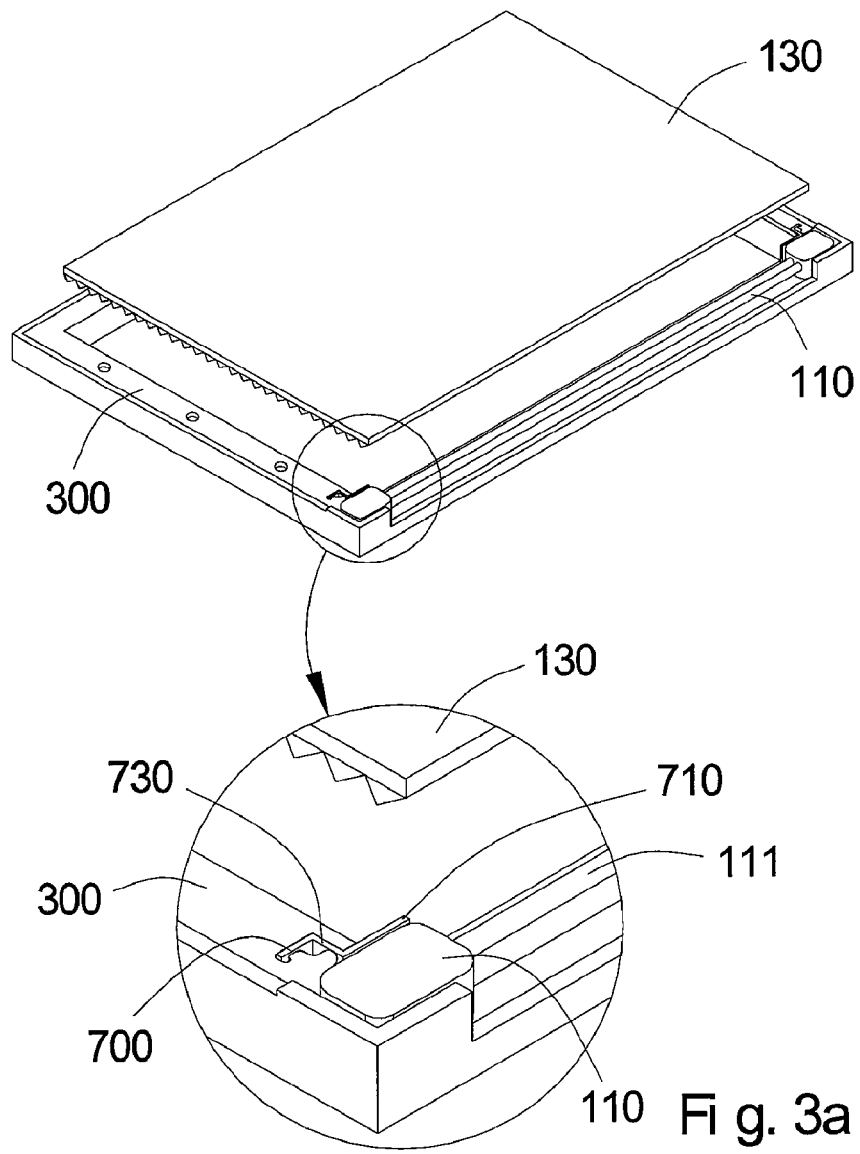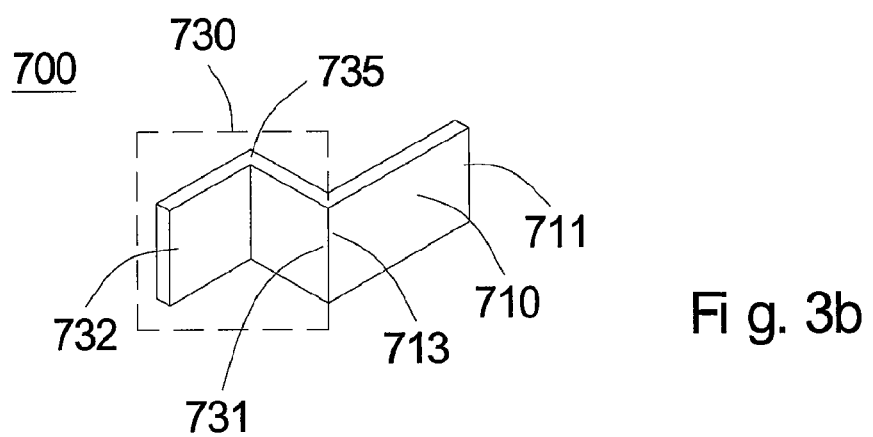

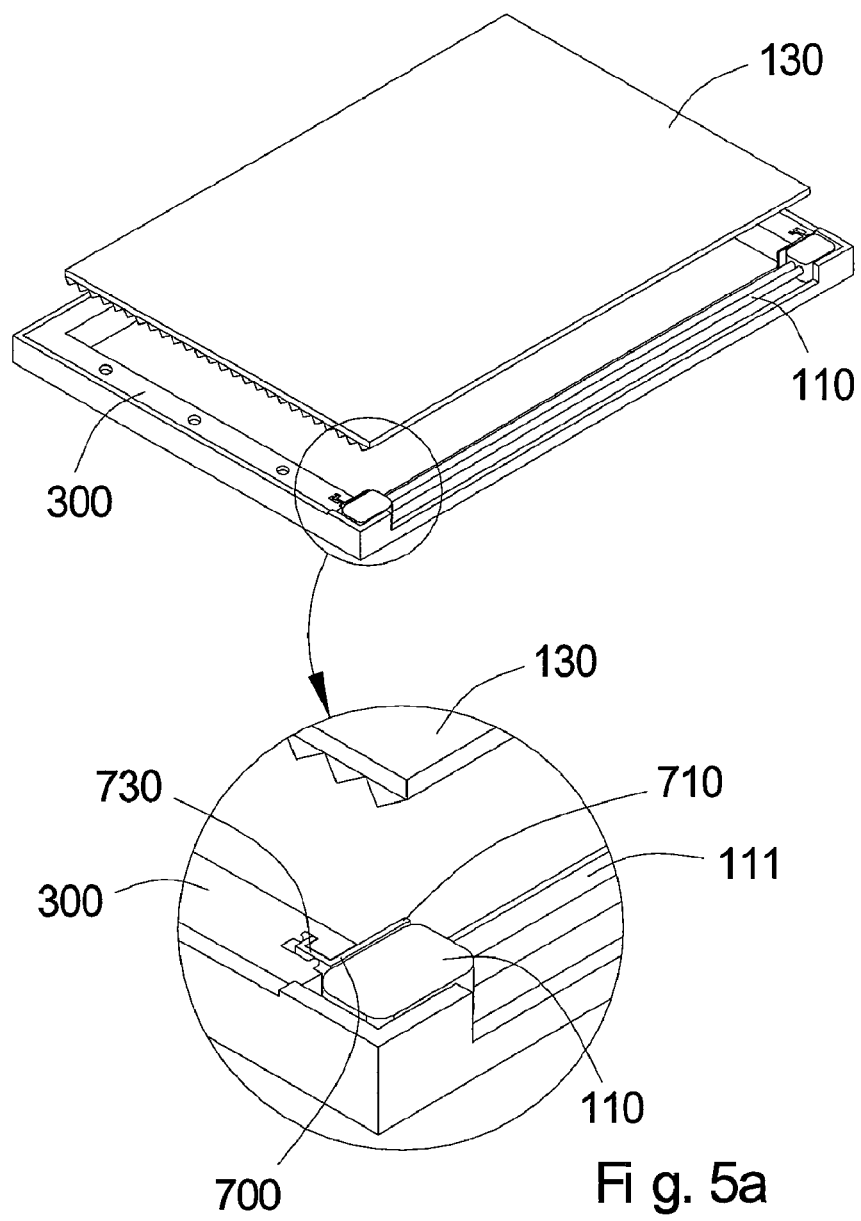
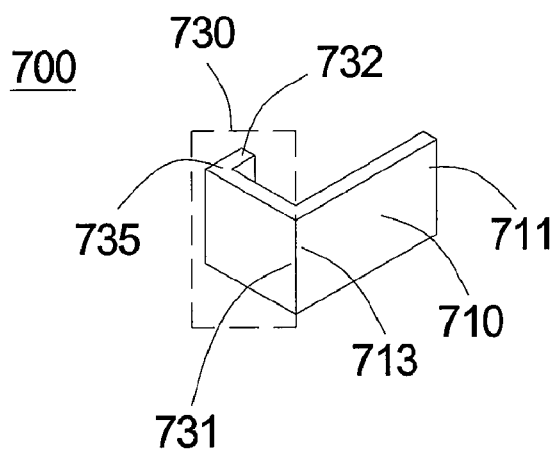
Fig. 5a
Fig. 5b

BACKLIGHT MODULE AND AN OPTICAL SLICE UNIT SUPPORT DEVICE THEREOF

BACKGROUND OF THE INVENTION

1. Field of the Invention

The present invention relates generally to a backlight module and a support device for an optical slice unit/a sheet-form optical element contained therein, and more particularly to a backlight module for a liquid crystal display (LCD) device and a support device for a sheet-form optical element contained therein.

2. Description of the Prior Art

Backlight modules are used extensively in liquid crystal display (LCD) devices, computers keyboards, cell phone buttons, billboards and other devices requiring light sources to provide the necessary flat light sources for these devices. Especially, the recent market demand for LCD devices has increased considerably. In order to match functional and exterior requirements of the LCD devices, the backlight module design for LCD devices has gradually become multidimensional.

FIG. 1 shows a schematic view of a conventional LCD device. As shown in FIG. 1, the LCD device comprises a backlight module 10, a liquid crystal (LC) panel 15 and a front frame 1.7 disposed on the backlight module 10. The backlight module 10 comprises a bottom bezel 21, a reflector 23, a frame 30, a light guide plate 13, a light source module 11 and optical films 59. The light guide plate 13 is disposed within the frame 30, and the light source module 11 is disposed between the light guide plate 13 and the frame 30 and corresponds to a bottom end of the light guide plate 13. The optical films 59 are disposed above the light guide plate 13, and the reflector 23 and the bottom bezel 21 are disposed under the frame 30 and the light guide plate 13.

When the assembly of the LCD device shown in FIG. 1 is complete and is disposed uprightly, the light guide plate 13 has a gravity pressing against the bottom end of the frame 30. In order to prevent the light guide plate 13 from sliding downward to press against or damage the light source module 11, the side-wall end of the frame 30 extends inwardly to form a stop plate 31. Through forming the stop plate 31, the frame 30 immobilizes the light guide plate 13 and prevents the light guide plate 13 from sliding downward. Generally speaking, the stop plate 31 is integratedly formed with the frame 30 by employing injection molding. Consequently, the material of the stop plate 31 is usually the same as that of the frame 30.

As users increasingly demand more visual effect, the dimensions of the LC panel 15 have increased as well. When the size of the LC panel 15 is increased, the size of the overall backlight module 10 and the light guide plate 13 have to increase accordingly. After the size of the light guide plate 13 is increased, the stop plate 31 shown in FIG. 1 also needs to bear a larger load. However, when the stop plate 31 formed integratedly with the frame 30 and being plastic made bears a light guide plate 13 having larger dimensions, it is susceptible to structural damage due to insufficient bearing capacity, and further damages the light source module below.

SUMMARY OF THE INVENTION

It is an object of the present invention to provide a backlight module having a higher structural stability.

It is another object of the present invention to provide a backlight module having a simple and easy assembly process.

It is a further object of the present invention to provide a support device used in a backlight module for supporting and positioning an optical slice unit/a sheet-form optical element in the backlight module.

It is yet another object of the present invention to provide a support device used in a backlight module having a higher bearing capacity.

The backlight module in accordance with the present invention mainly includes a light source module, a frame, a support device and an optical slice unit/a sheet-form optical element. The sheet-form optical element is disposed within the frame. The support device engages partially with the frame and supports the bottom end of the sheet-form optical element. The light source module is preferably disposed corresponding to the bottom end of the sheet-form optical element, and is situated between the bottom side of the frame and the bottom end of the sheet-form optical element.

The support device comprises a support portion and a positioning portion. The support portion has a support end and a connection end. The support end extends into the space within the frame and supports the bottom end of the sheet-form optical element. The positioning portion extends from the connection end of the support portion to provide the support force necessary for the support portion. The positioning portion has a first end, a second end and a bend portion connecting the first end with the second end. The first end connects to the connection end of the support portion, and an included angle exists between the first end and the support portion. Moreover, the support device is preferably made of metal materials, and the thickness of the support device preferably ranges between 0.2 millimeter (mm) and 0.8 mm.

The positioning portion of the support device is inset in the frame, and the support portion extends from the frame into the space within the frame. The frame includes side walls, and the positioning portion is inset in the side wall. The side wall of the frame preferably has a positioning groove and an edge. The cross sectional shape of the positioning groove is similar to that of the positioning portion of the support device, and the positioning portion is contained within the positioning groove to be inset in the side wall. Through disposing the bend portion, the support device cannot disengage from the positioning groove and from the side wall through any other directions besides the original inset direction of the positioning portion. When the support portion of the support device receives an external force produced by the sheet-form optical element, the support portion passes on and distributes the received force to the frame through the positioning portion.

BRIEF DESCRIPTION OF THE DRAWINGS

FIG. 3a is a schematic view of the backlight module assembly embodiment.

FIG. 3b is a schematic view of the support device according to one embodiment of the present invention.

FIG. 4a is a back view of the embodiment shown in FIG. 3a.

FIG. 5a is a schematic view of another embodiment of the backlight module.

FIG. 5b is a schematic view of the support device of the embodiment shown in FIG. 5a.

FIG. 6b is a schematic view of the support device of the embodiment shown in FIG. 6a.

DETAILED DESCRIPTION OF THE PREFERRED EMBODIMENT

The present invention provides a backlight module and a support device for an optical slice unit/a sheet-form optical element contained within the backlight module. For the preferred embodiment, the backlight module is used in a liquid crystal display (LCD) device. However, in other embodiments, the backlight module may be used in computer keyboards, cell phone buttons, billboards and other devices requiring flat light sources. Specifically speaking, the present invention further includes a LCD device using the backlight module. In the preferred embodiment, the LCD device in accordance with the present invention includes a color LCD device. However, in other embodiments, the LCD device according to the present invention may include a monochromatic LCD device. The above LCD device refers generally to display devices using liquid crystal (LC) panels, including LC monitors of household LCTVs, personal computers and laptops, and LC display screens of cell phones and digital cameras, etc.

Figure 1:
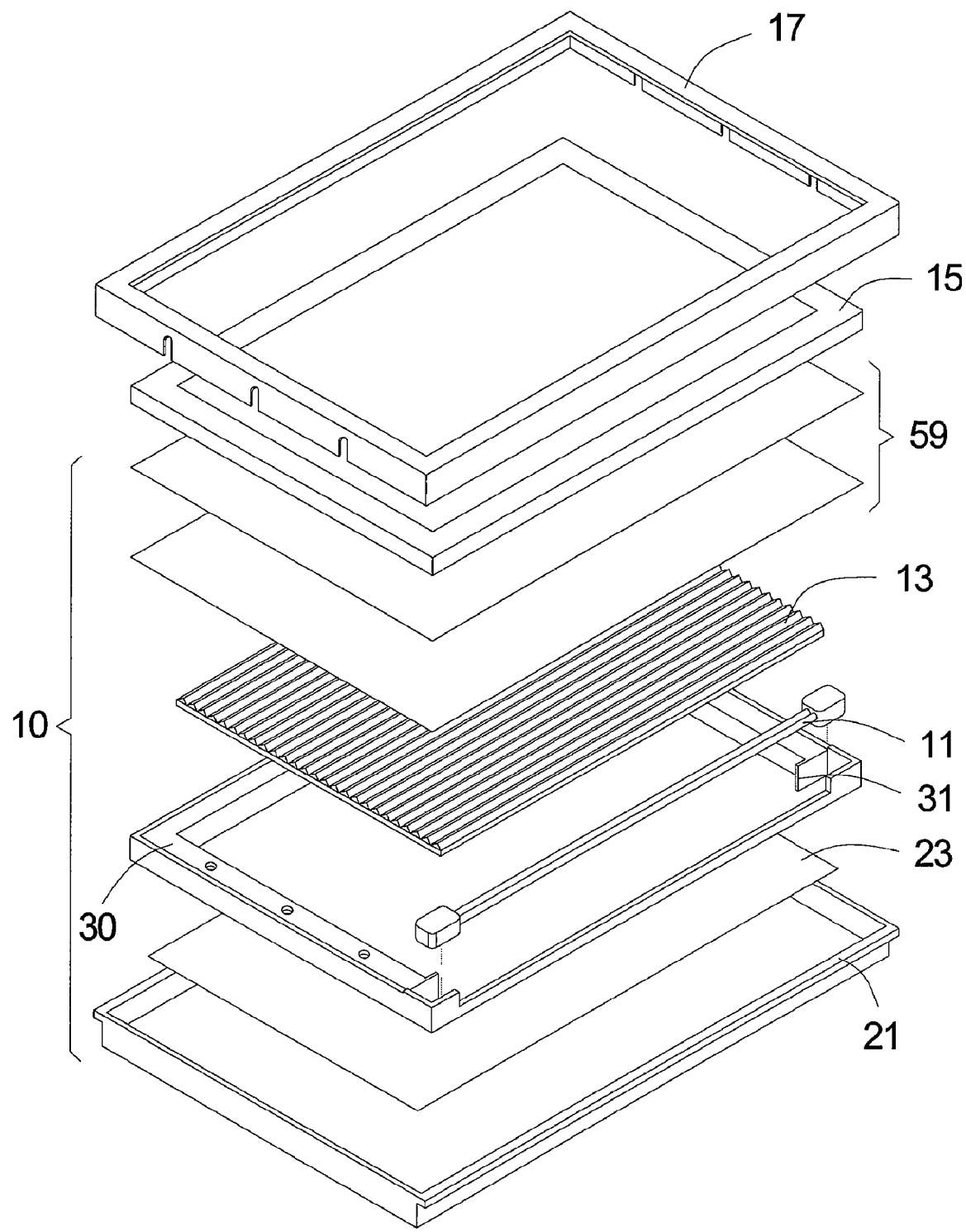
FIG. 1 is a schematic view of a conventional liquid crystal panel and backlight module.
Figure 2:
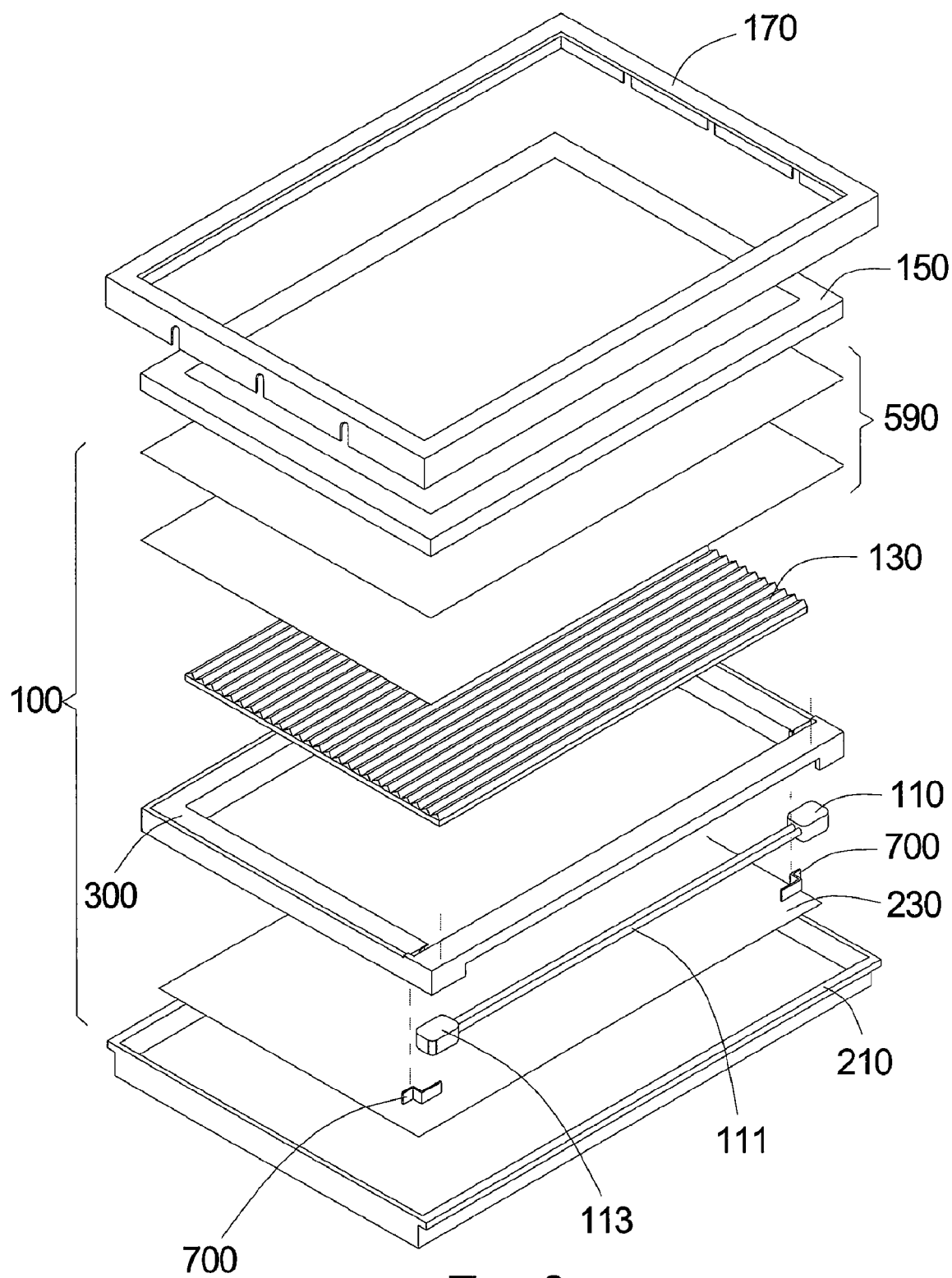
FIG. 2 is an exploded view of the LCD device and backlight module according to one embodiment of the present invention.

As the embodiment shown in FIG. 2, the LCD device comprises a backlight module 100, a LC panel 150 and an upper cover 170. The backlight module 100 mainly includes a light source module 110, a frame 300, a support device 700 and an optical slice unit/a sheet-form optical element 130. The sheet-form optical element 130 is disposed within the frame 300. The support device 700 connects to the frame 300 and supports a bottom end of the sheet-form optical element. As shown in FIG. 2, the support device 700 is preferably inset partially into the frame 300. The light source module 110 is preferably disposed corresponding to the bottom end of the sheet-form optical element, and is situated between the bottom side of the frame 300 and the bottom end of the sheet-form optical element 130. In the preferred embodiment, the support device 700 positions the sheet-form optical element 130 and prevents the sheet-form optical element from moving downward to press against or damage the light source module 110. Moreover, the LCD device may further include a bottom bezel 210 and a reflector sheet 230. The bottom bezel 210 is disposed below the frame 300 and the sheet-form optical element 130, and the reflector sheet 230 is disposed between the bottom bezel 210 and the sheet-form optical element 130. In addition, the bottom bezel 210 may be used as a lamp reflector or a lamp cover to improve the efficiency of the light usage.

The light source module 110 preferably includes a lamp tube 111 and lamp tube holding members 113. However, in other embodiments, the light source module 110 may use point light sources, such as light emitting diodes (LEDs). The sheet-form optical element 130 preferably includes a light guide panel. The above sheet-form optical element 130 includes planiform optical elements, such as optical plates or optical films. In the embodiment shown in FIG. 2, the sheet-form optical element 130 is a light guide panel having optical microstructures on the surface. In this embodiment, the optical microstructures having V-shaped cross sections are formed on the upper surface of the light guide panel; however, in other embodiments, the optical microstructures may be other-shaped prism structures formed on the lower surface of the light guide panel, or formed on the both sides of the light guide panel. In addition, the sheet-form optical element 130 may include a light guide panel having no microstructures thereon, the sheet-form optical element 130 may also include a diffusion film, brightness enhancing film, optical films 590 or other sheet-form optical element 130.

As shown in FIG. 3a and FIG. 3b, the support device 700 includes a support portion 710 and a positioning portion 730. The support portion 710 has a support end 711 and a connection end 713. As shown in FIG. 3b, the support portion 710 includes an extending strip structure, and the support end 711 and the connection end 713 are situated at opposite ends respectively of the strip structure. The support end 711 extends into a space within the frame 300 and supports the bottom end of the sheet-form optical element 130. The positioning portion 730 extends from the connection end 713 of the support portion 710, and is preferably formed integratedly with the support portion 710. The positioning portion 730 has a first end 731, a second end 732 and a bend portion 735 connecting the first end 731 with the second end 732. The first end 731 connects to the connection end 713 of the support portion 710, and an included angle exists between the first end 731 and the support portion 710. In the embodiment shown in FIG. 4a, the first end 731 of the positioning portion 730 is perpendicular to the support portion 710. However, in other embodiments, an acute angle or an obtuse angle may exist between the first end 731 of the positioning portion 730 and the support portion 710 depending on the space limits or mechanics design requirements.

In the preferred embodiment, the support device 700 is integratedly formed. Moreover, the support device 700 is preferably made of metal materials. When a metal-made strip structure is used to make the support device 700, the support portion 710 and the positioning portion 730 can be formed by employing bending, stamping or punching. In order to reach more desirable support strength, the thickness of the support device 700 is preferably between 0.2 millimeter (mm) and 0.8 mm. However, in other embodiments, the support device 700 may be formed by injection molding high strength polymer materials or other methods.

Figure 4A:
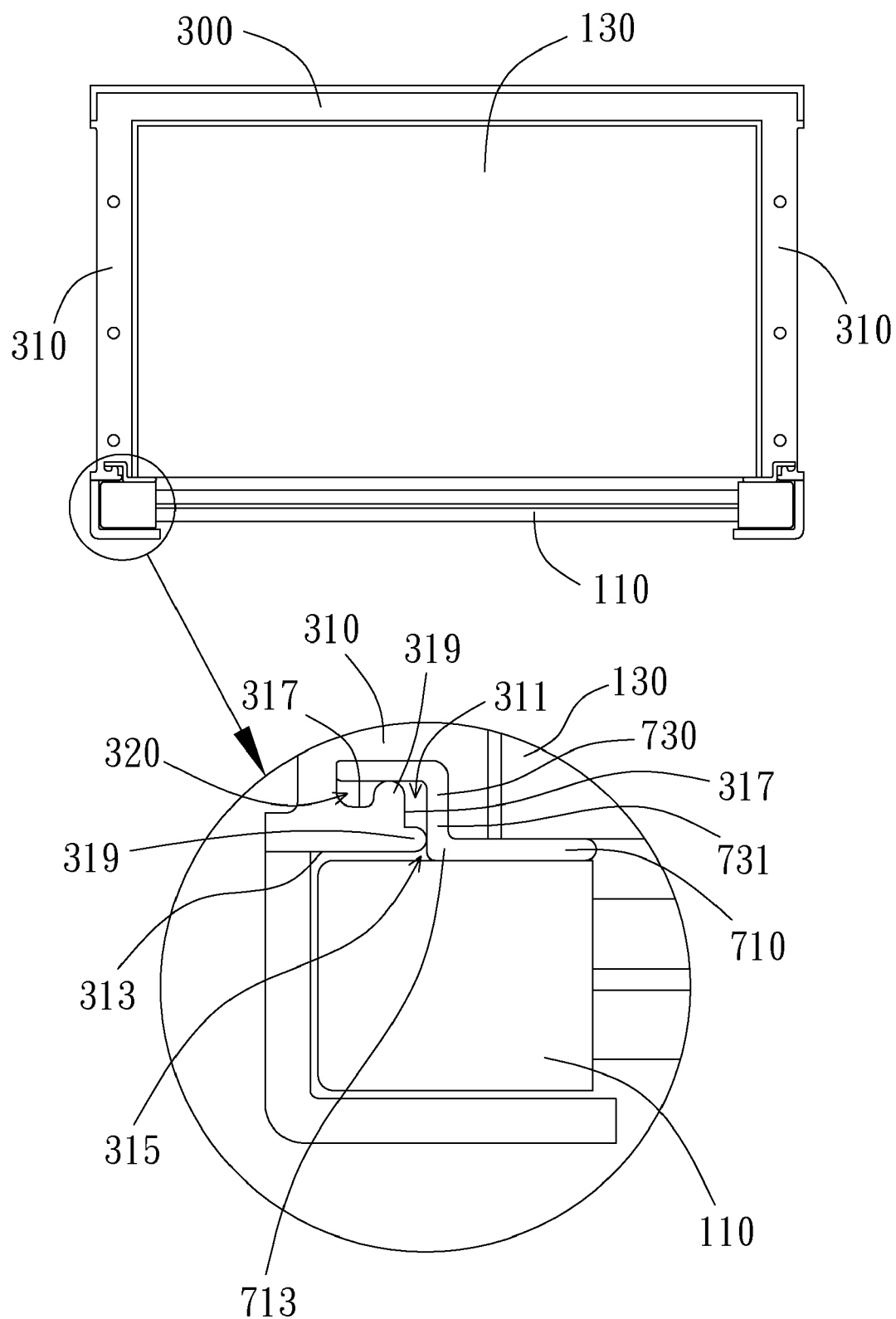

As shown in FIG. 3a and FIG. 4a, the positioning portion 730 of the support device 700 is inset in the frame 300, and the support portion 710 extends from the frame 300 into the space within the frame 300. In this preferred embodiment, the frame 300 includes side walls 310, and the positioning portion 730 is inset in the side walls 310. In other words, the support device 700 cannot disengage from the side wall 310 through any other directions besides the original inset direction of the positioning portion 730. In this embodiment, the frame 300 has a pair of side walls 310 where the support devices 700 are inset therein respectively. The pair of the disposed support devices 700 support two ends respectively of the bottom end of the sheet-form optical element 130 to achieve and maintain stable support effect.

Figure 4B:
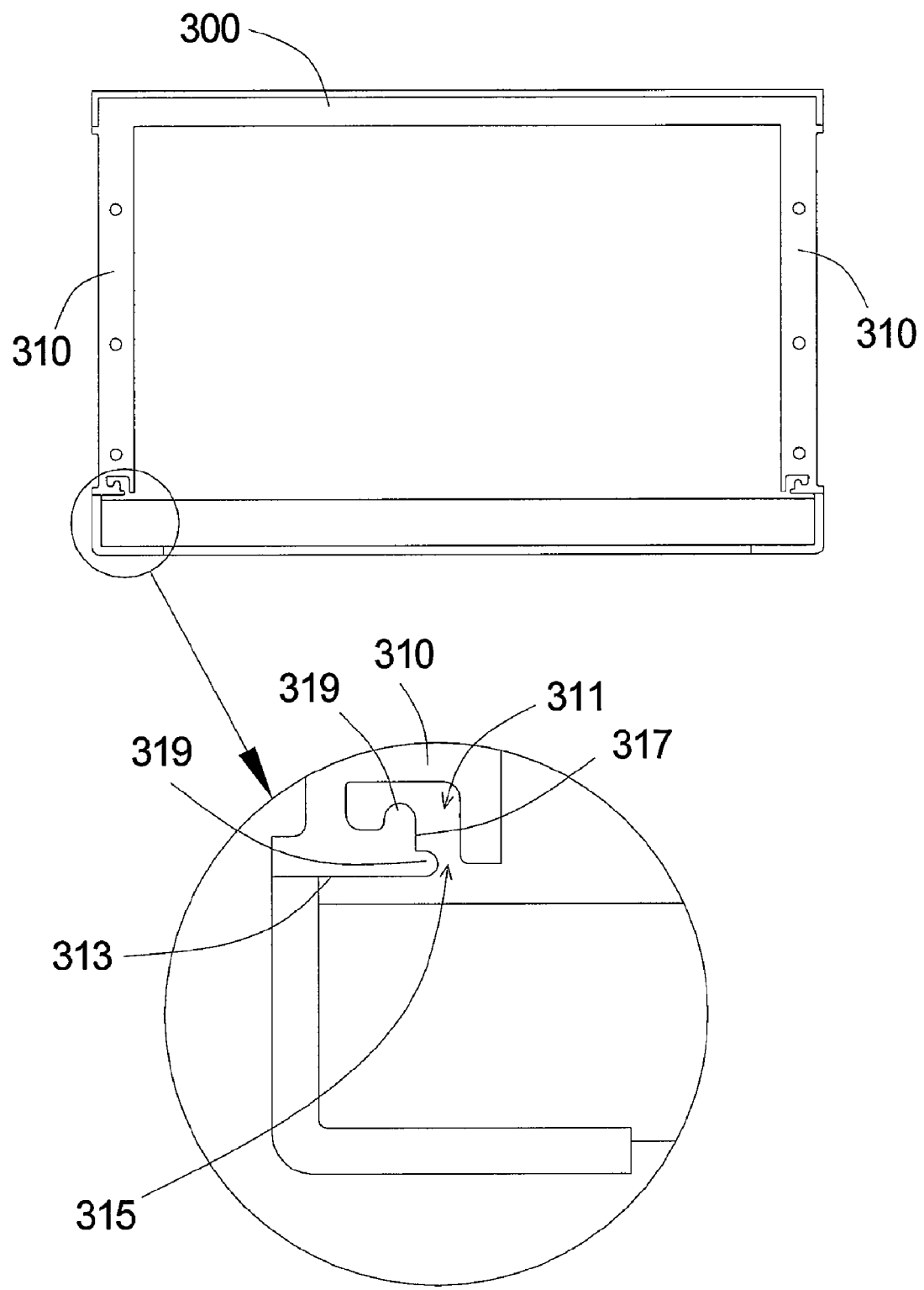
FIG. 4b is a back view of the embodiment of the frame.

Furthermore, as shown in FIG. 4b, each of the side walls 310 of the frame 300 preferably has a positioning groove 311 and an edge 313. The cross sectional shape of the positioning groove 311 is similar to that of the positioning portion 730 of the support device 700, and the positioning portion 730 is contained within the positioning groove 311 to be inset in the side wall 310. In this embodiment, since the light source module is disposed at the bottom end of the frame 300, the edge 313 of the side wall 310 corresponds to one end of the light source module 110. The positioning groove 311 has an open end 315 on the edge 313 of the side wall 310. When the positioning portion 730 of the support device 700 is inset in the positioning groove 311, the second end of the positioning portion 730 corresponds to the open end 315. In addition, the support portion 710 of the support device 700 extends from the second end of the positioning portion 730 along the edge 313 of the side wall 310 into the space within the frame 300.

As the embodiment shown in FIG. 4a and FIG. 4b, the side wall 310 has an inner-wall surface 317 within the positioning groove 311. In other words, the inner-wall surface is formed on one side within the positioning groove 311. Protruding parts 319 are formed on the inner-wall surface 317. The protruding parts 319 touch against the positioning portion 730 of the support device 700. Through disposing the protruding parts 319, the positioning portion 730 is held firmly within the positioning groove 311 to prevent the positioning portion 730 from moving or rotating within the positioning groove 311. Moreover, as shown in FIG. 4b, the inner-wall surface 317 is preferably the outer-side inner-wall surface corresponding to the positioning groove 311. The above outer-side inner-wall surface refers to the inner-wall surface 317 closer to the outside of the frame 300 and further away from the sheet-form optical element 130. Consequently, the protruding parts 319 formed on the outer-side inner-wall surface touch against the outside of the positioning portion 730. However, in other embodiments, the protruding parts 319 may be formed on the inner-side inner-wall surface 317, or formed respectively on the outer-side and inner-side inner-wall surface 317.

Furthermore, the positioning groove 311 includes a gap 320 between the inner-wall surface 317 and the positioning portion 730. In other words, the positioning portion 730 is disposed in the positioning groove 311 with a gap 320 formed between the inner-wall surface 317 and the positioning groove 311 since the protruding part 319 protrudes from the inner-wall surface 317 into the positioning groove 311.

Figure 4C:
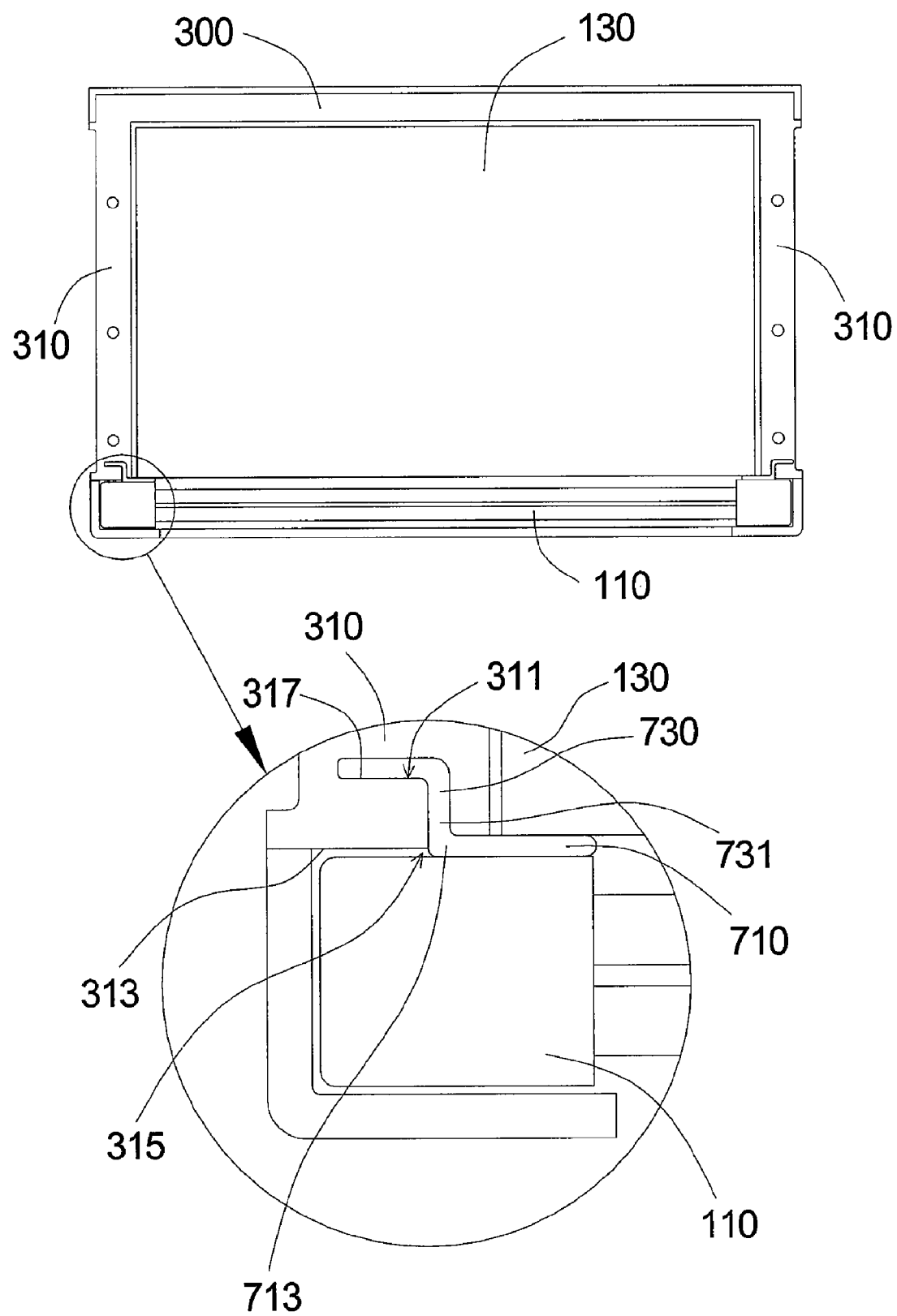
FIG. 4c is a back view of another embodiment of the backlight module.

As shown in FIG. 4a and FIG. 4b, two protruding parts 319 are formed on the inner-wall surface 317. One protruding part is formed close to the open end 315 of the positioning groove 311. This protruding part 319 touches against the outer side of the first end 731 of the positioning portion 730 of the support device 700. When the support portion 710 of the support device 700 receives an external force generated by the sheet-form optical element 130, this protruding part 319 gives intensively an opposite reaction force to the first end 731 of the positioning portion 730 to prevent the support device 700 from rotating or linear displacement. However, in other embodiments, as shown in FIG. 4c, when the cross sectional shape of the positioning portion 730 of the support device 700 is the same as the positioning groove 311, it is not needed to dispose the protruding parts 319 on the inner-wall surface 317 of the positioning groove 311. Because the thickness of the positioning portion 730 is the same as the width of the positioning groove 311, the inner-wall surface 317 of the positioning groove 311 has inherent capability for holding the positioning portion 730 and prevents the positioning portion 730 from shaking within the positioning groove 311. When no protruding parts 319 are disposed, outer-side inner-wall surface also gives an opposite reaction force to the outer side of the positioning portion 730 to achieve force balance.

The positioning portion 730 of the support device 700 has a bend portion 735 for connecting the first end 731 with the second end 732. In the embodiment shown in FIG. 3a and FIG. 3b, the bend portion 735 mainly includes an included-angle bending portion. In other words, an acute angle, a right angle or an obtuse angle exists between the first end 731 and the second end 732. In the preferred embodiment, as shown in FIG. 4a, the included-angle bending portion forming the bend portion is a 90 degree right-angle bending portion. And the first end 731 extending direction of the positioning portion 730 is perpendicular to the second end 732 extending direction. In addition, the second end 732 extending direction of the positioning portion 730 is opposite to the support end 711 extending direction of the support portion 710.

Through disposing the bend portion 735, the support device 700 cannot disengage from the positioning groove 311 and from the side wall 310 through any other directions besides the original inset direction of the positioning portion 730. When the support portion 710 of the support device 700 receives an external force produced by the sheet-form optical element 130, the support portion 710 passes on and distributes the force to the frame 300 through the positioning portion 730. As shown in FIG. 4a, when the external force produced by the sheet-form optical element 130 has a downward component force perpendicular to the support portion 710, the second end 732 of the positioning portion 730 parallel to the support portion 710 provides a resistance force to balance the component force of this external force.

FIG. 5a and FIG. 5b show another embodiment of the present invention. In this embodiment, the bend portion 735 also includes an included-angle bending portion. However, the difference from the previous embodiment is that the second end 732 extending direction of the positioning portion 730 is the same as the support end 711 extending direction of the support portion 710. This design also enables the support device 700 to be inset in the positioning groove 311, and to pass on and distribute the received external force to the frame 300.

Figure 6A:
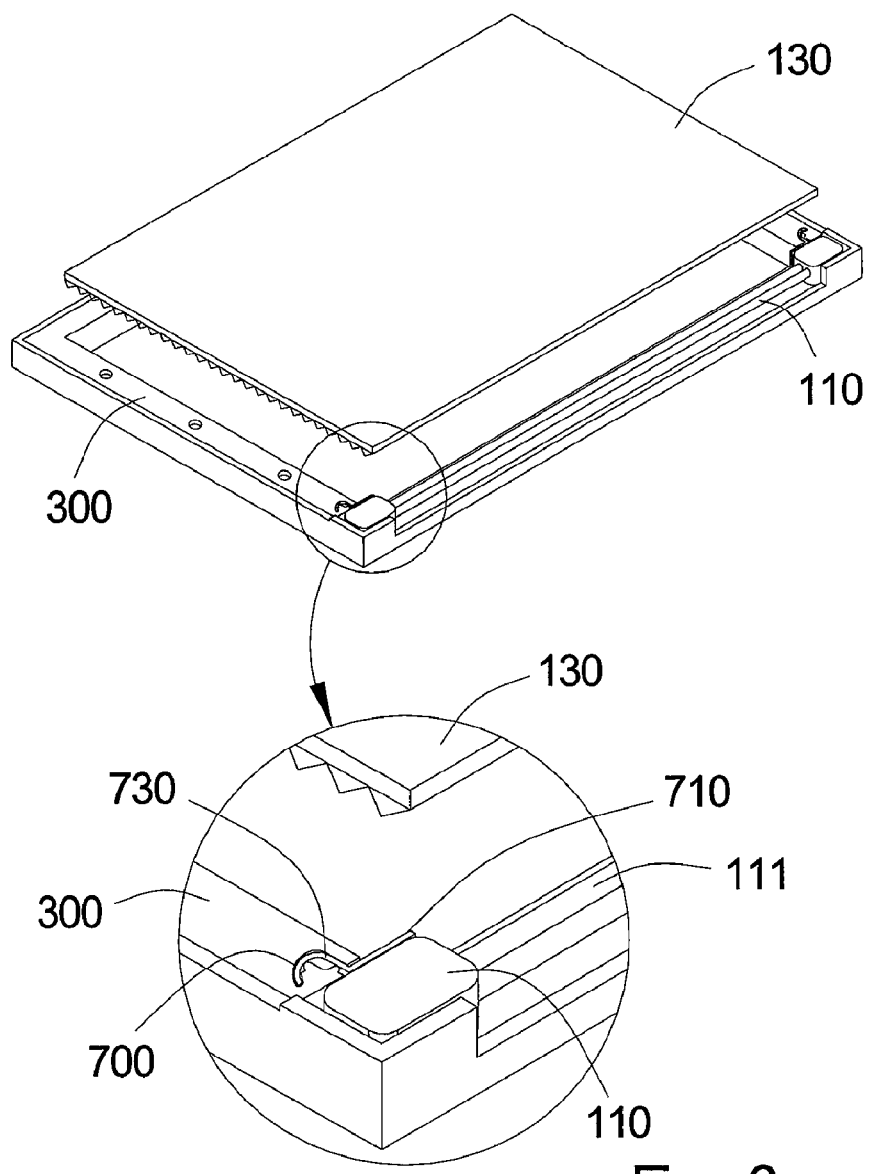
FIG. 6a is a schematic view of a further embodiment of the backlight module.
Figure 6B:
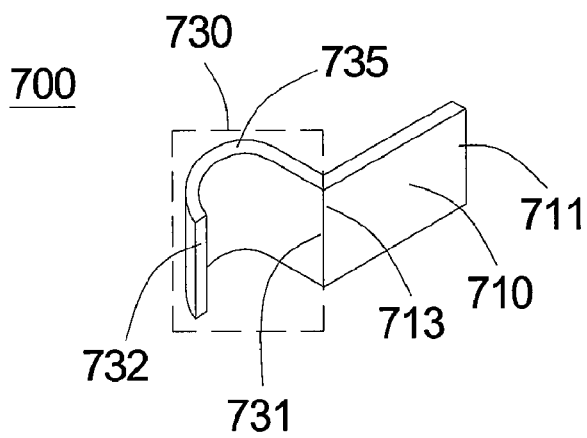

FIG. 6a and FIG. 6b show a further embodiment of the present invention. In this embodiment, the bend portion 735 mainly includes a curved portion; in other words, a curved portion exists between the first end 731 and the second end 732. In the preferred embodiment, as shown in FIG. 6a and FIG. 6b, the round angle forming the bend portion 735 is close to 180 degrees. And the first end 731 extending direction of the positioning portion 730 roughly parallels to the second end 732 extending direction. This design enables the support device 700 to be inset in the positioning groove 311, and to pass on and distribute the received external force to the frame 300.

From the foregoing, it shall be appreciated that specific embodiments of the invention have been described herein for purposes of illustration, but that various modifications and alterations may be made by those skilled in the art without deviating from the spirit and scope of the invention. For example, it shall be understood that there is no intention to limit the positioning portion 730 to the specific forms disclosed, but on the contrary, the invention is to cover all modifications, alternate constructions and equivalents falling within the spirit and scope of the invention. Accordingly, the invention is not limited except as by the appended claims.

What is claimed is:

1. A backlight module comprising:
   a frame having a positioning groove and a protruding part extending into said positioning groove;
   a sheet-form optical element disposed within said frame, said sheet-form optical element has a bottom end; and
   a support device comprising:
      a support portion having a support end and a connection end, wherein said support end supports said bottom end of said sheet-form optical element; and
      a positioning portion having a first end, a second end, and at least a bend portion connecting said first end with said second end, said first end connecting to said connection end of said support portion, an included angle existing between said first end and said support portion, wherein said positioning portion is inset in said positioning groove, said protruding part touches against said positioning portion, and said support portion of said support device extends from said frame into a space within said frame.

2. The backlight module of claim 1, wherein said frame includes a side wall, and said positioning portion is inset in said side wall.

3. The backlight module of claim 2, wherein said side wall of said frame includes said positioning groove and an edge, said positioning groove has an open end on said edge, said second end of said positioning portion corresponds to said open end, and said support portion extends into said space within said frame along said edge.

4. The backlight module of claim 3, wherein said side wall has an inner-wall surface inside said positioning groove, said protruding part is formed on said inner-wall surface, and said protruding part touches against one side of said positioning portion of said support device.

5. The backlight module of claim 4, wherein said inner-wall surface of said positioning groove is an outer-side inner-wall surface, and said protruding part touches against outer side of said positioning portion.

6. The backlight module of claim 3, wherein position of said protruding part is close to said open end.

7. The backlight module of claim 4, wherein said positioning groove includes a gap between said inner-wall surface and said positioning portion.

* * * * *